(12) United States Patent
Sesko

(10) Patent No.: US 7,990,522 B2
(45) Date of Patent: Aug. 2, 2011

(54) DYNAMIC COMPENSATION OF CHROMATIC POINT SENSOR INTENSITY PROFILE DATA SELECTION

(75) Inventor: David William Sesko, Woodinville, WA (US)

(73) Assignee: Mitutoyo Corporation, Kawasaki-shi (JP)

( * ) Notice: Subject to any disclaimer, the term of this patent is extended or adjusted under 35 U.S.C. 154(b) by 930 days.

(21) Appl. No.: 11/940,214

(22) Filed: Nov. 14, 2007

(65) Prior Publication Data
US 2010/0283989 A1    Nov. 11, 2010

(51) Int. Cl.
*G01C 3/08* (2006.01)
(52) U.S. Cl. ...... 356/4.04; 356/3.01; 356/3.1; 356/3.15; 356/4.01; 356/4.1
(58) Field of Classification Search ........ 356/3.01–3.15, 356/4.01–4.1, 5.01–5.15, 6–22, 28, 28.5
See application file for complete search history.

(56) References Cited

U.S. PATENT DOCUMENTS

| | | | |
|---|---|---|---|
| 4,585,349 A | 4/1986 | Gross | |
| 4,820,048 A | 4/1989 | Barnard | |
| 5,379,065 A | 1/1995 | Cutts | |
| 5,578,745 A | 11/1996 | Bayer | |
| 5,644,512 A | 7/1997 | Chernoff | |
| 5,785,651 A | 7/1998 | Kuhn | |
| 6,016,684 A | 1/2000 | Scheer | |
| 6,028,008 A | 2/2000 | Bayer | |
| 6,029,115 A | 2/2000 | Tracy | |
| 6,327,041 B1 | 12/2001 | Guern | |
| 6,480,285 B1 | 11/2002 | Hill | |
| 6,869,480 B1 | 3/2005 | Abel | |
| 7,002,143 B2 | 2/2006 | Parker | |
| 2005/0030528 A1 | 2/2005 | Geffen | |
| 2006/0024061 A1 | 2/2006 | Wirth | |
| 2006/0109483 A1 | 5/2006 | Marx | |

(Continued)

FOREIGN PATENT DOCUMENTS

DE    42 11 875 A1    10/1993
(Continued)

OTHER PUBLICATIONS

Geary, J.M., "Introduction to Lens Design," Willmann-Bell, Richmond, Va., 2002, p. 176.
(Continued)

*Primary Examiner* — Thomas H Tarcza
*Assistant Examiner* — Luke D. Ratcliffe
(74) *Attorney, Agent, or Firm* — Christensen O'Connor Johnson Kindness PLLC

(57) ABSTRACT

In a chromatic point sensor, distance measurements are based on a distance-indicating subset of intensity profile data, which is selected in a manner that varies with a determined peak position index coordinate (PPIC) of the profile data. The PPIC indexes the position a profile data peak. For profile data having a particular PPIC, the distance-indicating subset of the profile data is selected based on particular index-specific data-limiting parameters that are indexed with that same particular PPIC. In various embodiments, each set of index-specific data-limiting parameters indexed with a particular PPIC characterizes a distance-indicating subset of data that was used during distance calibration operations corresponding to profile data having that PPIC. Distance-indicating subsets of data may be compensated to be similar to a corresponding distance-indicating subset of data that was used during calibration operations, regardless of overall intensity variations and detector bias signal level variations.

16 Claims, 8 Drawing Sheets

U.S. PATENT DOCUMENTS

2006/0197949 A1 9/2006 Bouzid
2007/0148792 A1 6/2007 Marx
2010/0225926 A1 9/2010 van Amstel

FOREIGN PATENT DOCUMENTS

| DE | 102 28 477 A1 | | 1/2004 |
| --- | --- | --- | --- |
| DE | 10 2004 052 205 A1 | | 5/2006 |
| EP | 1 647 799 A1 | | 4/2006 |
| EP | 164779 | * | 4/2006 |

OTHER PUBLICATIONS

"Optical Pens: Micrometric Measurement Range," Stil S.A., Aix-en-Provence, France, product brochure published on or before Mar. 6, 2007.

Molesini, G., and F. Quercioli, "Pseudocolor Effects of Longitudinal Chromatic Aberration," Journal of Optics (Paris) 17(6):279-282, Nov. 1986.

Smith, W.J., "Modern Optical Engineering," 3d ed., SPIE Press—McGraw-Hill, New York, 2000, p. 94.

Villatoro, J., et al., "Fabrication and Modeling of Uniform-Waist Single-Mode Tapered Optical Fiber Sensors," Applied Optics 42(13):2278-2283, May 1, 2003.

Nahum, M., "On-Site Calibration Method and Object for Chromatic Point Sensors," U.S. Appl. No. 12/330,431, filed Dec. 8, 2008.

European Search Report dated Feb. 27, 2009, issued in corresponding European Application No. EP 08 16 7845, filed Oct. 29, 2008.

* cited by examiner

| Distance Indicating Coordinate (DIC) | Measurement Distance (microns) |
|---|---|
| 1 | Out of range |
| ≈ | ≈ |
| 104.1 | 36.9029 |
| 104.2 | 37.0303 |
| 104.3 | 37.1804 |
| 104.4 | 37.3557 |
| 104.5 | 37.4863 |
| ≈ | ≈ |
| 604.1 | 381.6882 |
| 604.2 | 381.7224 |
| 604.3 | 381.7565 |
| ≈ | ≈ |
| 990.1 | 486.6540 |
| 990.2 | 486.6733 |
| ≈ | ≈ |
| 1024 | Out of range |

| Peak Pixel Index = ppic | CSthresh(ppic) |
|---|---|
| 1 | Out of Range |
| ≈ | ≈ |
| 104 | 0.26946 |
| 105 | 0.26973 |
| 106 | 0.27 |
| 107 | 0.27027 |
| 108 | 0.27054 |
| 109 | 0.27081 |
| 110 | 0.27108 |
| ≈ | ≈ |
| 604 | 0.0621 |
| 605 | 0.06156 |
| 606 | 0.06102 |
| 607 | 0.06048 |
| 608 | 0.05994 |
| 609 | 0.0594 |
| ≈ | ≈ |
| 1004 | 0.108 |
| 1005 | 0.10908 |
| 1006 | 0.11016 |
| 1007 | 0.11124 |
| ≈ | ≈ |
| 1024 | Out of range |

DYNAMIC COMPENSATION OF CHROMATIC POINT SENSOR INTENSITY PROFILE DATA SELECTION

FIELD OF THE INVENTION

The invention relates generally to precision measurement instruments, and more particularly to a chromatic point sensor in which dynamic compensation of data selection is performed when analyzing a spectral intensity profile.

BACKGROUND OF THE INVENTION

It is known to use chromatic confocal techniques in optical height sensors. As described in U.S. Patent Application Publication No. US2006/0109483 A1, which is hereby incorporated herein by reference in its entirety, an optical element having axial chromatic aberration, also referred to as axial or longitudinal chromatic dispersion, may be used to focus a broadband light source such that the axial distance to the focus varies with the wavelength. Thus, only one wavelength will be precisely focused on a surface, and the surface height or position relative to the focusing element determines which wavelength is best focused. Upon reflection from the surface, the light is refocused onto a small detector aperture, such as a pinhole or the end of an optical fiber. Upon reflection from a surface and passing back through the optical system to the in/out fiber, only the wavelength that is well-focused on the surface is well-focused on the fiber. All of the other wavelengths are poorly focused on the fiber, and so will not couple much power into the fiber. Therefore, for the light returned through the fiber the signal level will be greatest for the wavelength corresponding to the surface height or position of the surface. A spectrometer type detector measures the signal level for each wavelength, in order to determine the surface height.

Certain manufacturers refer to practical and compact systems that operate as described above, and that are suitable for chromatic confocal ranging in an industrial setting, as chromatic point sensors. A compact chromatically-dispersive optical assembly that is used with such systems is referred to as an "optical pen". The optical pen is connected through the optical fiber to an electronic portion of the CPS, which transmits light through the fiber to be output from the optical pen and provides the spectrometer that detects and analyzes the returned light. In known implementations, pixel data corresponding to the wavelength-dispersed intensity profile received by the spectrometer's detector array is analyzed to determine the "dominant wavelength position coordinate" for the intensity profile, and the resulting position coordinate is used with a lookup table to determine the position of the surface. However, in practical applications, known implementations exhibit certain undesirable measurement variations. Reducing or eliminating such measurement variations would be desirable.

SUMMARY OF THE INVENTION

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

For clarity, it is convenient to introduce definitions for a number of terms used throughout this disclosure. In general, these terms are used consistently in the sense defined here. However, in some instances a different meaning and or further explanation may be attributed to these terms, depending on their context.

Spectral intensity profile—means the wavelength-dispersed intensity profile received by the spectrometer's detector array pixels. Sometimes simply called an intensity profile herein.

Spectral peak—means the point along the spectral intensity profile having the highest intensity, which may fall between pixels.

Profile signals or Profile data—means measurement signals provided by the spectrometer, corresponding to a spectral intensity profile. The profile signals or data may, in some embodiments, and include error corrections described further below. In various embodiments, each profile signal S is associated with a pixel p (e.g., p=1 to 1024 for a 1024 element detector array) of the spectrometer's detector array, and may be referred to as S(p) herein. Various characteristics of the profile signals or data may also be referred to as characteristics of the underlying spectral intensity profile.

Detector measurement axis—means the axis along which the detector pixels are distributed and along which the spectral wavelengths are distributed. Sometimes simply called the measurement axis herein. Each pixel p may be thought of as having a pixel coordinate p along the measurement axis.

Peak signal level—means the highest profile signal.

Peak pixel—means the detector pixel that has the peak signal level. The peak pixel coordinate may be designated ppc.

Peak position index coordinate—ppic—means an index coordinate (along the measurement axis) that is determined based on the profile signals and that is proximate to (or equal to) the peak pixel coordinate. Sometimes simply called the index coordinate herein. According to one aspect of this invention, the index coordinate is used to index certain index-specific data-limiting parameters, and when performing measurement operations for profile data having a particular peak position index coordinate ppic, the measurement operations are based on the index-specific data-limiting parameters that have that same peak position index coordinate ppic.

Distance indicating coordinate (DIC)—means a sub-pixel resolution coordinate along the detector measurement axis that is determined based on the profile data, and that indicates the measurement distance to the workpiece surface (e.g., by use of a lookup table). According to one aspect of this invention, the distance indicating coordinate is based on a distance-indicating subset of the data.

Distance-indicating subset of the data—means a limited subset of the profile data that is used for determining a distance indicating coordinate. According to one aspect of this invention, the distance-indicating subset of the data is limited in a manner that varies with the determined peak position index coordinate of the profile data. According to one aspect of this invention, during measurement operations the distance-indicating subset of the data is limited based on certain index-specific data-limiting parameters that have an index coordinate corresponding to the peak position index coordinate of the profile data Measurement-time—a time when the CPS is used to measure a distance to a workpiece surface, during regular operation of the CPS. Measurement-time operations may be referred to as measurement operations.

Calibration-time—a time when the CPS is used to determine the distance indicating coordinate that corresponds to a known calibration distance to a surface, during calibration operations that establish distance calibration data for the CPS. Calibration-time operations may be referred to as calibration operations.

The present invention is directed to providing a chromatic point sensor (CPS) that overcomes the disadvantages of prior systems, in order to provide more consistent and accurate measurements. One source of error in prior chromatic point sensors is that, for a given measurement distance, the repeatability of the determination of the distance indicating coordinate may vary with variations in the overall signal intensity and/or detector voltage drifts (e.g., bias voltage drifts). Since a variety of surface types are typically measured, variations of the intensity are unavoidable. Similarly, voltage drifts associated with temperature changes due to the ambient room temperature and/or heat generated by the electronics, and the like, are unavoidable. Furthermore, the effect of such variations is different at different measurement distances, because the CPS wavelength response is non-uniform, and therefore the proportion of a profile signal that is affected by such variations is different for the different wavelengths produced by different measurement distances.

According to one aspect of the invention, each distance indicating coordinate is based on a distance-indicating subset of the profile data, and the distance-indicating subset of the profile data is selected or limited in a manner that varies with a determined peak position index coordinate ppic of the profile data. Such an approach takes the non-uniform CPS wavelength response into consideration.

According to a further aspect of the invention, sets of index-specific data-limiting parameters are stored as calibration parameters in the CPS and are indexed by corresponding peak position index coordinates, and when performing measurement operations for profile data having a particular peak position index coordinate ppic, the distance-indicating subset of the data is selected or limited based on the set of index-specific data-limiting parameters that is indexed by that same particular peak position index coordinate ppic.

According to a further aspect of the invention, when performing measurement operations, the distance-indicating subset of data is limited in a way that depends on the particular peak position index coordinate ppic, and that is also dynamically compensated for variations in the overall signal intensity and/or detector bias voltage drifts.

According to a further aspect of the invention, during distance calibration operations the distance indicating coordinate for a set of calibration-time profile data is determined based on a particular distance-indicating subset of the profile data, which varies with the particular peak position index coordinate of the profile data. In the sets of index-specific data-limiting parameters that are stored as calibration parameters in the CPS, the set of index-specific data-limiting parameters that is indexed by that same particular peak position index coordinate ppic is based on, and reflects, a defining feature of that same particular calibration-time distance-indicating subset of data. As a result, when performing measurement operations for measurement-time profile data having that same particular peak position index coordinate ppic, the distance-indicating subset of the data may be selected or limited based on that particular set of index-specific data-limiting parameters, and the resulting measurement-time distance-indicating subset of the data may have an improved degree of similarity (e.g., a similar peak shape and asymmetry) to the calibration-time distance-indicating subset of data. Thus, the resulting measurement-time distance indicating coordinate may be more properly comparable to CPS distance calibration data.

According to a further aspect of the invention, each particular set of index-specific data-limiting parameters includes information that allows the measurement-time distance-indicating subset of the data to be dynamically compensated for variations in the overall signal intensity and/or detector bias voltage drifts in comparison to the overall signal intensity and/or detector bias voltage that was present at calibration-time. Thus, the resulting measurement-time distance indicating coordinate may be more properly comparable to CPS distance calibration data, despite variations in the overall signal intensity and/or detector bias voltage drifts.

According a further aspect of the invention, in various embodiments, each particular set of index-specific data-limiting parameters includes information that characterizes a limiting threshold value of a calibration-time distance-indicating subset of data, corresponding to a particular peak position index coordinate ppic, in terms of a proportion of a peak height of the calibration-time profile data corresponding to the particular peak position index coordinate ppic. In some embodiments the peak height may be expressed as a relative peak height, which is the difference between a peak signal level and a bias signal level of the calibration-time profile data, and the limiting threshold value is characterized as a proportion of the relative peak height above the bias signal level.

According to a further aspect of the invention, when performing measurement operations corresponding to a particular peak position index coordinate ppic, the distance-indicating subset of data is limited by a limiting threshold value based on the set of index-specific data-limiting parameters having the same particular peak position index coordinate ppic, resulting in a measurement-time proportion between the limiting threshold value and peak height of the measurement-time profile data that is approximately the same as a calibration-time proportion between a limiting threshold value and a peak height of the calibration-time profile data corresponding to the same particular peak position index coordinate ppic. In some embodiments the peak height may be expressed as a relative peak height, which is the difference between a peak signal level and a bias signal level of the of the calibration-time profiled data. As a result, the measurement-time distance-indicating subset of data dynamically compensated for variations in the overall signal intensity and/or detector bias voltage drifts in comparison to the overall signal intensity and/or detector bias voltage that was present at calibration-time. Thus, the resulting measurement-time distance indicating coordinate is more properly comparable to CPS distance calibration data, despite variations in the overall signal intensity and/or detector bias voltage drifts Specific embodiments disclosed in greater detail below are particularly well suited to supporting high measurement rates, on the order of 5-75 KHz, while at the same time they are based on measurement data that is uniquely dynamically compensated as outlined above to provide significant robustness and accuracy benefits. It should be appreciated that accuracy and robustness improvements in the submicron regime are extremely difficult to attain, and that some CPS error components eliminated according to the methods of this invention may not have been previously recognized. In one embodiment, the novel combination of features disclosed herein deviate from known methods to produce CPS repeatability and accuracy on the order of tens of nanometers over a 300 micron measuring range.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 5 is a diagram of a CPS distance calibration lookup table for referencing distance indicating coordinates to measurement distances;

FIG. 6 is a diagram of a CPS calibration lookup table for referencing peak position index coordinates to index-specific data-limiting parameters;

DETAILED DESCRIPTION OF THE PREFERRED EMBODIMENT

Figure 1:
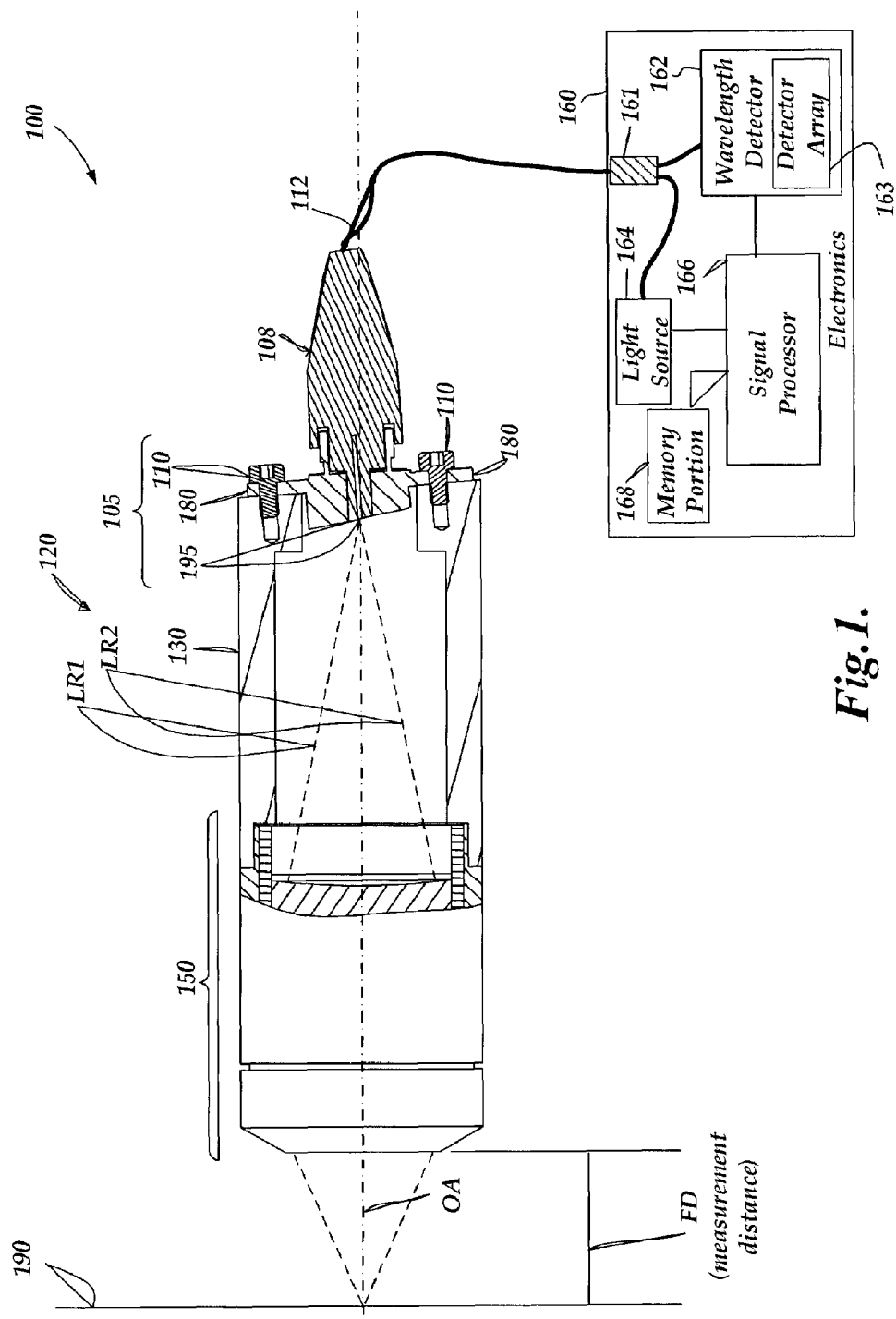
FIG. 1 is a block diagram of an exemplary chromatic point sensor.

FIG. 1 is a block diagram of an exemplary chromatic point sensor 100. As shown in FIG. 1, the chromatic point sensor 100 includes an optical pen 120 and an electronics portion 160. The optical pen 120 includes an in/out fiber optic sub-assembly 105, a housing 130, and an optics portion 150. The in/out fiber optic sub-assembly 105 includes a mounting element 180, that may be attached to the end of the housing 130 using mounting screws 110. The in/out fiber optic sub-assembly 105 receives an in/out optical fiber (not shown) through a fiber optic cable 112 which encases it, and through a fiber optic connector 108. The in/out optical fiber outputs an output beam through an aperture 195, and receives reflected measurement signal light through the aperture 195.

In operation, light emitted from the fiber end through the aperture 195 is focused by the optics portion 150, which includes a lens that provides an axial chromatic dispersion such that the focal point along the optical axis OA is at different distances depending on the wavelength of the light, as is known for chromatic confocal sensor systems. The light is focused on a workpiece surface 190. Upon reflection from the workpiece surface 190, the reflected light is refocused by the optics portion 150 onto the aperture 195 as illustrated by the limiting rays LR1 and LR2. Due to the axial chromatic dispersion, only one wavelength will have the focus distance FD that matches the measurement distance from the optical pen 100 to the surface 190. The wavelength that is best focused at the surface 190 will also be the wavelength of the reflected light that is best focused at the aperture 195. The aperture 195 spatially filters the reflected light such that predominantly the best focused wavelength passes through the aperture 195 and into the core of the optical fiber cable 112. As will be described in more detail below, the optical fiber cable 112 routes the reflected signal light to a wavelength detector 162 that is utilized for determining the wavelength having the dominant intensity, which corresponds to the measurement distance to the workpiece surface 190.

The electronics portion 160 includes a fiber coupler 161, the wavelength detector 162, a light source 164, a signal processor 166 and a memory portion 168. In various embodiments, the wavelength detector 162 includes a spectrometer arrangement wherein a dispersive element (e.g., a grating) receives the reflected light through the optical fiber cable 112 and transmits the resulting spectral intensity profile to a detector array 163. The wavelength detector 162 may also include related signal processing (e.g., provided by the signal processor 166, in some embodiments) that removes or compensates certain detector-related error components from the profile data. Thus, certain aspects of the wavelength detector 162 and the signal processor 166 may be merged and/or indistinguishable in some embodiments.

The white light source 164, which is controlled by the signal processor 166, is coupled through the optical coupler 161 (e.g., a 2×1 optical coupler) to the fiber cable 112. As described above, the light travels through the optical pen 120 which produces longitudinal chromatic aberration so that its focal length changes with the wavelength of the light. The wavelength of light that is most efficiently transmitted back through the fiber is the wavelength that is in focus on the surface 190. The reflected wavelength-dependent light intensity then passes through the fiber coupler 161 again so that approximately 50% of the light is directed to the wavelength detector 162, which receives the spectral intensity profile distributed over an array of pixels along a measuring axis of the detector array 163, and operates to provide corresponding profile data. Example profile data will be described in more detail below with respect to FIGS. 4 and 7. The subpixel-resolution distance indicating coordinate of the profile data is calculated by the signal processor 166, and determines the measurement distance to the surface via a distance calibration lookup table which is stored in the memory portion 168, as will be described in more detail below with respect to FIGS. 2 and 5. The distance indicating coordinate may be determined by various methods describe further below (e.g., by determining the centroid of profile data included in a peak region of the profile data). When the distance indicating coordinate is determined during calibration operations, it may be referred to as a calibration distance indicating coordinate, and when it is determined during workpiece surface measurement operations, it may be referred to as a measurement distance indicating coordinate.

Figure 2:
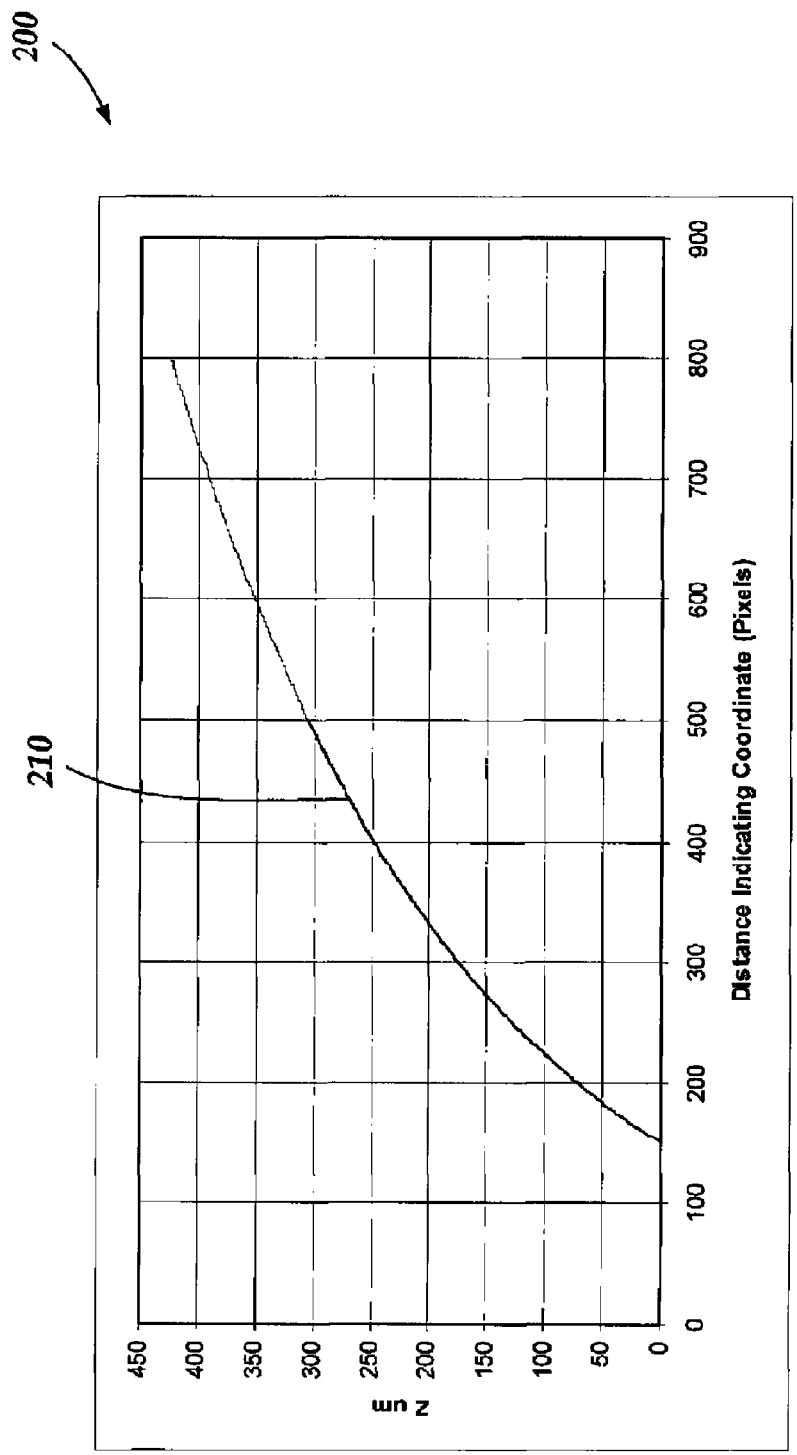
FIG. 2 is a diagram of CPS distance calibration data which correlates known measurement distances with distance indicating coordinates for a chromatic point sensor.

FIG. 2 is a diagram 200 of distance calibration data 210 which correlates known measurement distances Z (in microns) with distance indicating coordinates (in units of pixels) for a chromatic point sensor. The vertical axis includes an offset distance (not shown), which sets the reference or "zero" Z distance at a desired reference distance relative to the CPS optical pen 120. In the example shown in FIG. 2, the CPS optical pen 120 has a specified measurement range of 300 microns, which corresponds to calibration distance indicating coordinates in the range of approximately 150-490 pixels. Thus, the measurement range of a particular optical pen 120 may correspond to a subset of the pixels of the detector array 163. However, the CPS may be calibrated over a larger pixel range of the detector array 163, if desired. For example, FIG. 2 shows additional distance calibration data over the range of 500-800 pixels, and over a range of pixels less than 150 (corresponding to distances less than the "zero" or offset distance).

In one embodiment, the distance calibration data 210 may be generated as follows. A mirror may provide a calibration surface (e.g., surface 190 of FIG. 1) along the optical axis OA of the CPS optical pen. The displacement of the mirror may be controlled by a stepper motor which steps the calibration measurement distance in approximately 0.1 or 0.2 micron steps. For each step, the actual mirror position or displacement is acquired using a reference standard, such as an interferometer. For each position, the calibration distance indicating coordinate of the resulting profile data is determined as outlined further below, and the calibration distance indicating coordinate and corresponding actual position indicated by the interferometer are recorded to provide the calibration data 210.

Later, during measurement operations, to provide a distance measurement to a workpiece surface (e.g., surface 190 of FIG. 1), the workpiece surface is positioned along the optical axis OA of the CPS optical pen. The measurement distance indicating coordinate of the resulting profile data is determined. Then, the distance calibration data 210 is used to correlate that specific measurement distance indicating coordinate to a corresponding measurement distance Z.

According to this invention, the measurement distance indicating coordinate is determined based on a distance-indicating subset of the profile data, and the distance-indicating subset of the data is selected or limited in a manner that varies with a determined peak position index coordinate of the profile data, as previously outlined and described in greater detail below. It should be appreciated that although the calibration data 210 may appear to form a smooth curve in FIG. 2, it actually includes micron- or submicron-level fluctuations, which may occur over a short range (e.g., a few, or several, pixels). Thus, in various embodiments, the index-specific data-limiting parameters (e.g., the index-specific data-limiting parameter CSthresh(ppic), described further below) are used to dynamically adapt the measurement-time operations corresponding to a particular peak position index coordinate so that they specifically correspond to the calibration-time operations that were used in determining a calibration distance indicating coordinate corresponding to the same (or very nearly the same) particular peak position index coordinate. The resulting distance measurements for a workpiece surface are more robustly accurate and stable in comparison with those resulting from previously known CPS methods.

Figure 3:
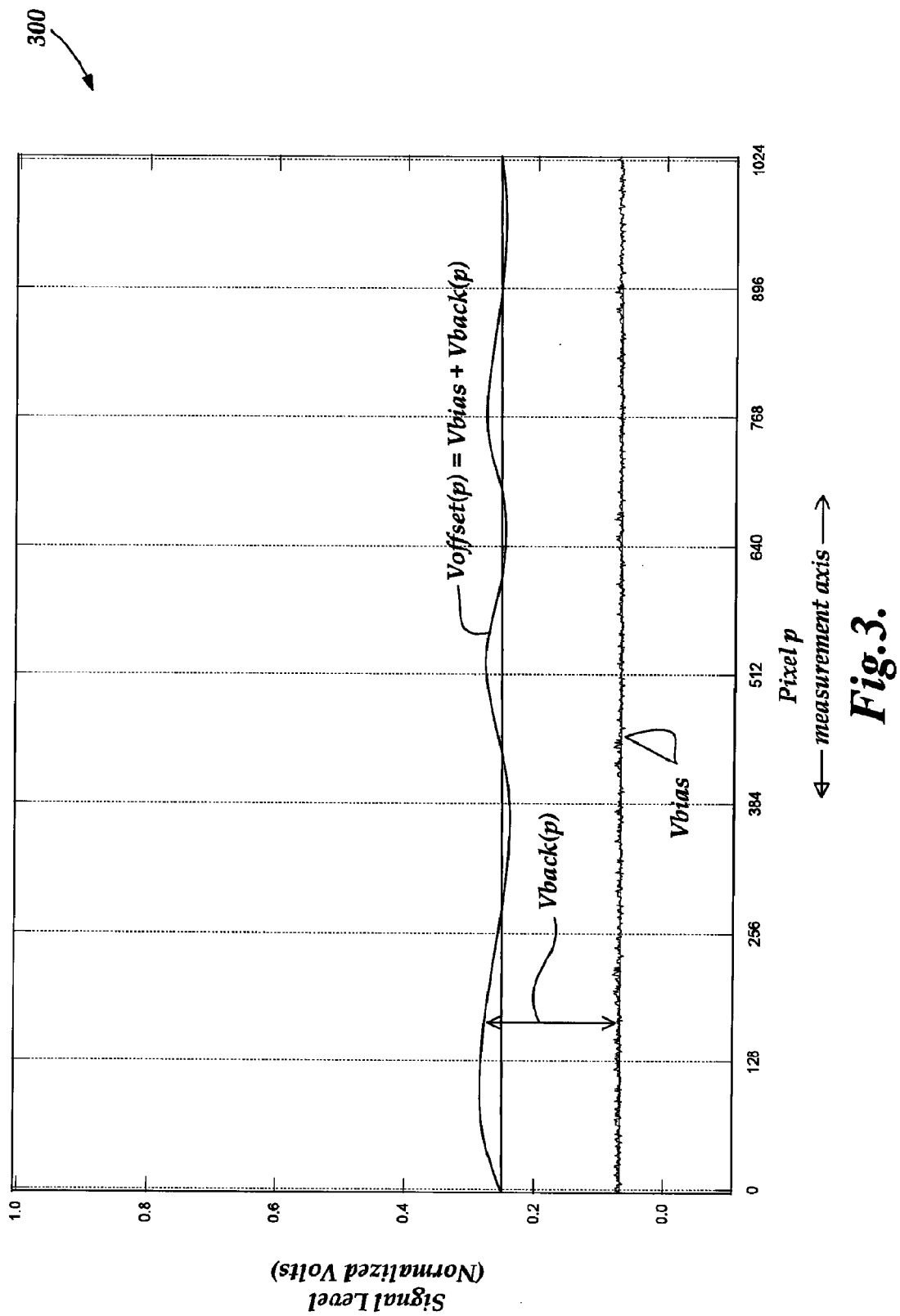
FIG. 3 is a diagram of profile data from a chromatic point sensor illustrating voltage offset signal levels for the pixels in a detector array.

FIG. 3 is a diagram 300 of profile data from a chromatic point sensor illustrating voltage offset signal levels Voffset(p) for the pixels in a detector array 163 when no measurement surface is present (e.g., surface 190 of FIG. 1 is not present), such that there is no intentionally reflected light and no significant dominant wavelength peak in the resulting intensity profile. As shown in FIG. 3, the voltage offset signal Voffset (p) is plotted in normalized volts, for each of 1,024 pixels. "Normalized volts" assigns a value of 1.0 to the saturation voltage of the detector array 163. The voltage offset signal Voffset(p) includes a bias signal level Vbias, which is shown as unvarying across the array, and a background signal component Vback(p), which is shown as being dependent upon the pixel coordinate p across the array. The variable background signal Vback(p) represents signals such as background light from wavelength-dependent spurious reflections and the like in the CPS, as well as due to the dark current of the various pixels p. In various embodiments, it is advantageous if the signal components Vback(p) (or signals that show the same variation, such as the voltage offset signals Voffset(p)) are stored for calibration or compensation of the pixel array of the detector array 163, and used to compensate all subsequent profile data signals from each pixel p (e.g., by subtraction), on an ongoing basis. Thus, the background signal component Vback(p) is assumed to compensated in known manner, and is not further described in relation to the various methods disclosed herein, and not included in the intensity profiles shown below with reference to FIGS. 4 and 7.

In contrast to the background signal component Vback(p), which may be relatively stable over time, the coordinate-independent bias signal level Vbias may be affected by factors such as temperature changes. In other words, the signal level Vbias changes as a result of voltage drifts associated with ambient temperature changes and heat generated by the electronics portion 160 during operation. Thus, in various embodiments according to this invention, measurement operations that determine distance indicating coordinates are based on a distance-indicating subset of the profile data that is dynamically adapted to compensate for changes in the contemporaneous bias signal level Vbias, resulting in more repeatable distance measurements, as described in greater detail below.

Figure 4:
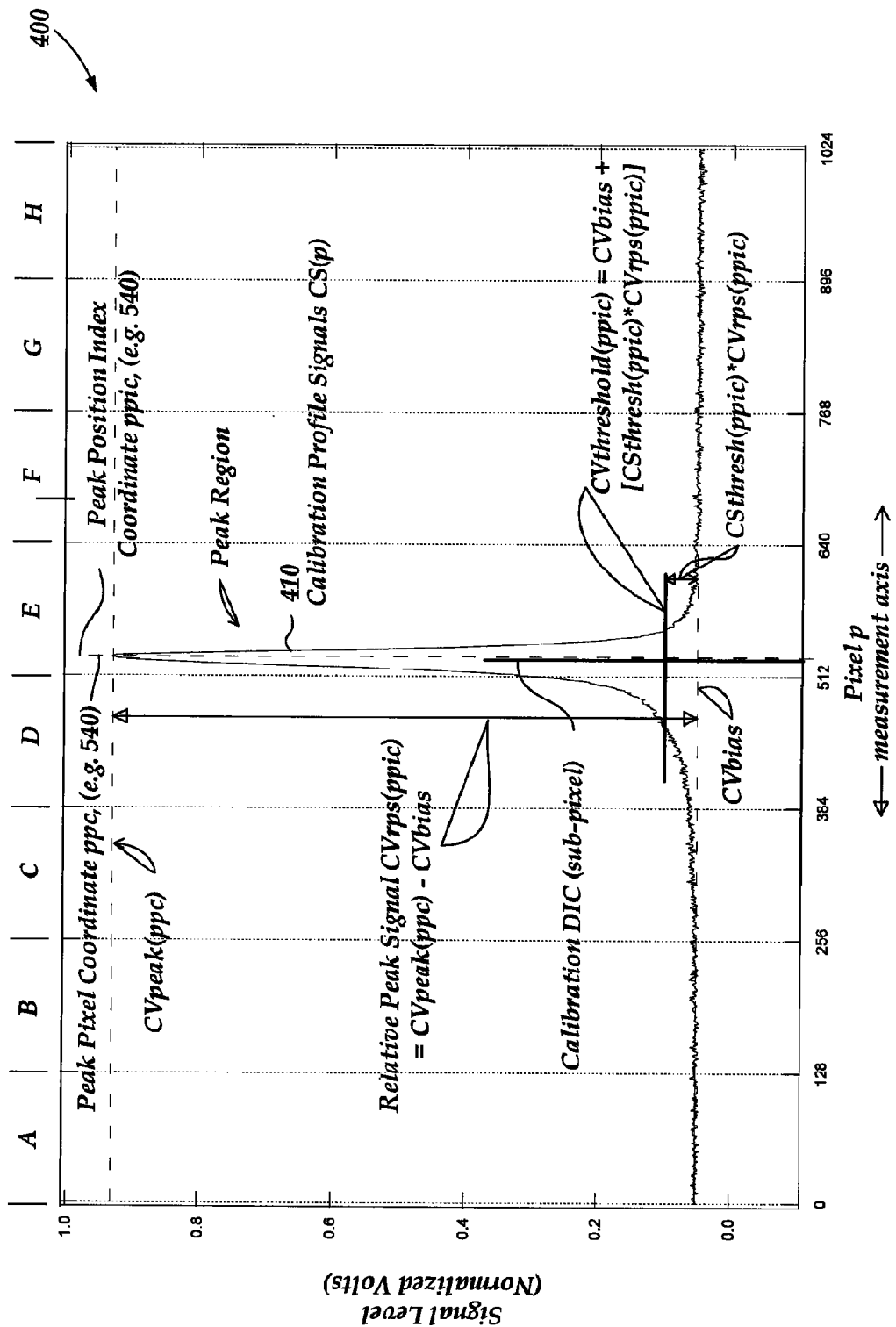
FIG. 4 is a diagram of profile data from a chromatic point sensor, as formed during calibration operations.

FIG. 4 is a diagram 400 of profile data 410 from a chromatic point sensor, as formed during calibration operations. The profile data 410 may also be referred to as the calibration profile signals CS(p), where CS(p) is the signal level (shown in normalized volts) associated with each pixel p. The graph 400 of FIG. 4 is similar to the graph 300 of FIG. 3, except that a calibration surface is positioned at a known distance along the optical axis OA of the optical pen 120, producing the associated profile data 410 having the dominant wavelength peak region shown in FIG. 4.

FIG. 4 shows a contemporaneous calibration bias signal level CVbias (in normalized volts). In most cases throughout this disclosure, it may be understood that variable names and values with a "C" prefix correspond to calibration-time data and operations. As outlined above with reference to FIG. 3, it is assumed that the signal components Vback(p) (or signals that show the same variation) have been previously removed from the profile data 410. Thus, in some embodiments, the calibration bias signal level CVbias may represent the difference between the contemporaneous bias signal level and a previously removed bias signal level. FIG. 4 also shows a peak pixel coordinate ppc and an associated peak signal level CVpeak(ppc), a peak position index coordinate ppic, and a relative peak signal level CVrps(ppic), and a threshold CVthreshold(ppic) that defines the lower limit of a distance-indicating subset of the data in the peak region, where all "CV" values are in normalized volts. FIG. 4 also shows a calibration distance indicating coordinate (calibration DIC) that is determined based on the distance-indicating subset of the data in the calibration spectral peak region. CSthresh (ppic) is an index-specific data-limiting parameter, specifically referred to as the scaled threshold parameter, which is described in greater detail below.

Briefly, in one embodiment according to this invention, calibration operations for determining a calibration distance indicating coordinate (a calibration DIC) and storing a related set of calibration data corresponding to the profile data 410, may include the following:

Determine the peak position index coordinate ppic corresponding to the profile data 410.

Determine the contemporaneous calibration bias signal level CVbias.

Determine a threshold CVthreshold(ppic) that defines the distance-indicating subset of the data that is used to determine the calibration distance indicating coordinate. In various embodiments, the threshold CVthreshold(ppic) is defined relative to the contemporaneous bias signal level CVbias.

Determine the calibration distance indicating coordinate (calibration DIC) with sub-pixel resolution, based on the distance-indicating subset of the data in the calibration peak region.

Determine the scaled threshold parameter CSthresh(ppic).

Store the calibration DIC and the corresponding known distance.

Store the peak position index coordinate ppic, and the corresponding index-specific data-limiting parameter CSthresh(ppic).

The determination of all of these elements, and their relationship to one another, are described in greater detail below.

The pixel coordinate of the highest-valued data point CS(p) of the profile data 410 is the peak pixel coordinate ppc, which is an integer-valued pixel coordinate (e.g., ppc=540 in FIG. 4). The associated peak signal level is CVpeak(ppc). For example, CVpeak(ppc)=CVpeak(540)=0.92 volts (approximately) in FIG. 4.

In general, in various embodiments, the peak position index coordinate ppic is an index coordinate determined for a set of profile data analyzed by a CPS according to this invention. In each case, the peak position index coordinate ppic is determined based on the profile data and it is proximate to the peak pixel coordinate ppc. Generally, in various embodiments, the peak position index coordinate ppic may determined in any convenient manner that causes it represent the position or coordinate of the peak region of a set of profile data in a consistent manner (e.g., as an average of the coordinates of the top three, or five, peak pixels, or the like). In the embodiment shown in FIG. 4, the peak pixel coordinate ppc is used as the peak position index coordinate ppic, and ppic is set equal to the particular value 540, based on the particular profile data 410.

In one embodiment, to determine the contemporaneous calibration bias signal level CVbias the profile data 410 is divided into 8 bins of 128 pixels (defined by vertical lines at the top of the graph 200 for bins A to H). In each bin A-H the intensity values are averaged, and the minimum of the 8 averages is taken as the contemporaneous calibration bias signal level CVbias. CVbias=0.05 volts (approximately) in FIG. 4.

In the embodiment shown in FIG. 4, during calibration operations, the threshold CVthreshold defines the lower limit of the signals CS(p) that are included in the distance-indicating subset of the data that is used to determine the calibration DIC. The designation CVthreshold(ppic) emphasizes that CVthreshold may vary for different sets of profile data, and a particular value for CVthreshold used with a particular set of profile data may be indexed with the appropriate index coordinate ppic. CVthreshold(ppic) may be determined according to one of a number of different methods. In general, a primary objective is to set CVthreshold(ppic) such that it excludes noisy and/or irrelevant data (e.g., data values on the order CVbias.) A secondary objective may be to retain as much valid (non-noisy) data as possible in the distance-indicating subset of the data. For example, as shown in FIG. 4, a typical spectral peak may be somewhat asymmetric about the peak pixel coordinate ppc, and this asymmetry may generally be a valid data feature that should be taken into account when determining the calibration DIC in various embodiments. Thus, it may be undesirable to set the CVthreshold(ppic) too far above CVbias, such that a significant amount of asymmetric data is excluded from the determination of the calibration DIC.

In one embodiment, CVthreshold(ppic) may be set at a constant predetermined offset relative to CVbias, where the predetermined offset conservatively exceeds any expected noise level (e.g., 5% of a saturated pixel signal level, or 10% of a minimum expected peak signal level, or the like). In another embodiment, CVthreshold(ppic) may be set at an offset relative to CVbias that depends on the height of the peak in the profile data (e.g., 8% of the difference between CVpeak(ppc) and CVbias). In other embodiments, a peak position index-specific offset relative to CVbias may be heuristically determined based on experience with typical noise levels, typical signal levels, typical asymmetries, and the like, arising from various surfaces at various distances over the measurement range of the CPS. In FIG. 4, CVthreshold(ppic) =0.10 volts (approximately), which is approximately 0.05 volts above CVbias in this example. It will be understood that regardless of the method of setting CVthreshold(ppic) at calibration time, its relationship (or the relationship of the resulting distance-indicating subset of calibration-time profile data) to the overall set of calibration-time data may be characterized and/or embodied in index-specific data-limiting parameters, which may be used to establish a similar threshold and/or distance-indicating subset of data during measurement-time operations corresponding to the same peak position index ppic, according to the principles of this invention.

In the embodiment shown in FIG. 4, the distance-indicating subset of data that is used to determine the calibration DIC is then determined to consist of all the data points of the intensity profile data 410 that have a signal value greater than CVthreshold(ppic). The calibration DIC is then determined with sub-pixel resolution, based on the distance-indicating subset of data. The calibration DIC may be determined according to one of a number of different methods. In one embodiment, the calibration DIC may be determined as the subpixel-resolution coordinate of the peak of a function fit to the distance-indicating subset of data (e.g., by a least squares fit of a Cauchy or Voigt lineshape function). In another embodiment, the calibration DIC may be determined as the subpixel-resolution coordinate of a centroid $X_C$ of the distance-indicating subset of data. For example, for a detector with 1024 pixels, the centroid $X_C$ may be determined according to:

$$X_C = \frac{\sum_{p=1}^{1024} p(S_C(p))^n}{\sum_{p=1}^{1024} (S_C(p))^n} \quad \text{(Eq. 1)}$$

where, $$S_C(p) = \begin{cases} CS(p) - CVthreshold(ppic), & \text{for } CS(p) \geq CVthreshold(ppic) \\ 0, & \text{for } CS(p) < CVthreshold(ppic) \end{cases} \quad \text{(Eq. 2)}$$

In one specific example embodiment, n=2, in EQUATION 1. It will be appreciated that EQUATION 2 restricts the data used in the centroid calculation to the distance-indicating subset of data.

Regarding the scaled threshold parameter CSthresh(ppic), as previously indicated, during distance calibration operations the calibration DIC for a set of calibration-time profile data may be determined based on a particular distance-indicating subset of the profile data, which varies with the particular peak position index coordinate of the profile data. Then, in sets of index-specific data-limiting parameters that are stored as calibration parameters in the CPS, the set of index-specific data-limiting parameters that is indexed by a particular peak position index coordinate ppic may be based on, and reflect, a defining feature of the particular calibration-time distance-indicating subset of data that was used to determine the calibration DIC corresponding to that particular peak position index coordinate ppic. As a result, when performing measurement operations for measurement-time profile data having that same particular peak position index coordinate ppic, the distance-indicating subset of the data may be selected or limited based on that particular set of index-specific data-limiting parameters, and the resulting measurement-time distance-indicating subset of the data may have an improved degree of similarity (e.g., a similar peak shape and asymmetry) to the calibration-time distance-indicating subset of data. Thus, the resulting measurement-time distance indicating coordinate may be more properly comparable to CPS distance calibration data. The scaled threshold parameter CSthresh(ppic) is one embodiment of a index-specific data-limiting parameter that may be used according to these principles.

In one embodiment, the scaled threshold parameter CSthresh(ppic) is determined based on CVthreshold(ppic), CVbias, and a relative peak signal level CVrps(ppic) defined as:

$$CVrps(ppic) = CVpeak(ppc) - CVbias \quad (Eq. 3)$$

The relative peak signal level CVrps(ppic) may also be described as the relative peak height.

The scaled threshold parameter CSthresh(ppic) is defined as:

$$CSthresh(ppic) = [CVthreshold(ppic) - CVbias)]/CVrps(ppc) \quad (Eq. 4)$$

The scaled threshold parameter CSthresh(ppic) defines a calibration-time ratio between the threshold CVthreshold(ppic) for the distance-indicating subset of the data relative to CVbias, and the peak signal level CVpeak(ppc) relative to CVbias, corresponding to the position index coordinate ppic. This index-specific scaled threshold parameter CSthresh(ppic) may be used later, in conjunction with workpiece measurement profile data having the same peak position index coordinate ppic, to define a measurement-time distance-indicating subset of data that it has a high degree of similarity to the distance-indicating subset of data that was used for determining the calibration DIC. The resulting measurement DIC will be more properly comparable to the corresponding distance calibration data, regardless of potential variations in the measurement bias signal level MVbias and the measurement peak signal level MVpeak(ppc), as described further below.

As outlined above, for a particular set of calibration profile data, the resulting calibration DIC and the corresponding known distance may then be stored, and the corresponding index-specific scaled threshold parameter CSthresh(ppic) may also be stored in association with its particular peak position index coordinate ppic.

FIG. 5 is a diagram 500 of a CPS distance calibration lookup table for referencing distance indicating coordinates to measurement distances. As shown in FIG. 5, in the left column the calibration DICs entries cover the pixel coordinates from 1 to 1,024, in increments of 0.1 pixel steps, and in the right column the corresponding measurement distance (in microns) are entered. During a workpiece measurement operation, the measurement DIC calculated by the chromatic point sensor is referenced to the stored calibration lookup table in order to determine the measurement distance corresponding to the measurement DIC. If the measurement DIC falls between adjacent calibration DIC values, then the measurement distance corresponding to the measurement DIC is determined by interpolation.

A data generating routine for generating calibration DICs corresponding to known measurement distances, in 0.1 or 0.2 micron increments, has been previously outlined with reference to FIG. 2. For each known measurement distance, the corresponding calibration DICs may be determined and stored as outlined above with reference to FIG. 4. That data may then be interpolated (if necessary) to provide the entries shown in the diagram 500, in pixel coordinate increments of 0.1 pixels. At the same time, the appropriate index-specific data limiting parameter (e.g., the scaled threshold parameter CSthresh(ppic)) may be stored in relation to the corresponding peak position index coordinate (ppic), as outlined above with reference to FIG. 4.

FIG. 6 is a diagram 600 of a CPS calibration lookup table for referencing particular peak position index coordinates ppic to index-specific data-limiting parameters, which in this example is the scaled threshold parameter CSthresh(ppic). As shown in FIG. 6, in the left column the peak position index coordinate entries cover the pixel coordinates of the wavelength detector array 163 from 1 to 1,024, and in the right column the corresponding index-specific data-limiting parameters CSthresh(ppic) are entered. The determination of the index-specific scaled threshold parameter CSthresh(ppi) has been previously outlined with reference to FIG. 4. Its use is described in greater detail with reference to FIG. 7, below. It will be appreciated that the scaled threshold parameter CSthresh(ppic) shown in FIG. 6 may, in effect, be a ratio between a relatively constant "noise margin" and a varying relative peak height CVrps(ppic). The relative peak height CVrps(ppic), in general, varies significantly depending on the corresponding wavelength. Thus, FIG. 6 shows that the values of the scaled threshold parameter CSthresh(ppic) vary significantly for the pixels in one portion of the detector array 163 in comparison to another portion.

It will be appreciated that a single peak position index coordinate ppic entry in the table of FIG. 6 may correspond to several calibration DIC entries in the table of FIG. 5 (e.g., those with distance indicating coordinates within approximately +/− one-half pixel of a particular position index coordinate ppic), each of which may have had a slightly different corresponding scaled threshold parameter CSthresh(ppic) determined during calibration operations. However, over such a small range (e.g., +/− one-half pixel), the scaled threshold parameter CSthresh(ppic) entry in the table of FIG. 6 may be determined as an average or median, or the like, of several values of CSthresh(ppic) which correspond to the same peak position index coordinate ppic.

Figure 7:
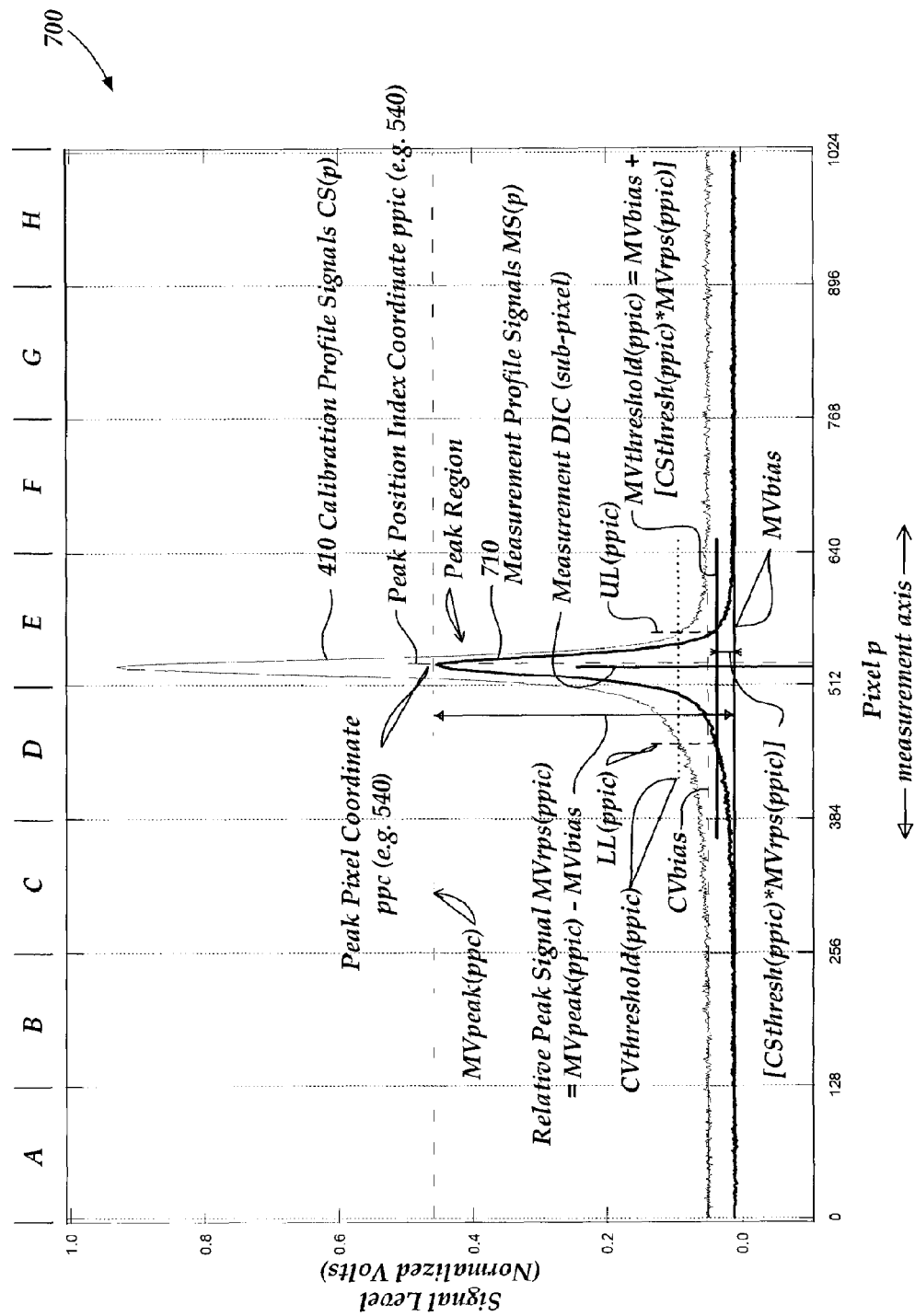
FIG. 7 is a diagram of profile data from a chromatic point sensor, as formed during measurement operations.

FIG. 7 is a diagram 700 of profile data 710 from a chromatic point sensor as formed during measurement operations. The profile data 710 may also be referred to as measurement profile signals MS(p), where MS(p) is the signal level associated with each pixel p (in normalized volts). In most cases throughout this disclosure, it may be understood that variable names and values with an "M" prefix correspond to measurement-time operations. The graph 700 of FIG. 7 is similar to the graph 400 of FIG. 4, except that a workpiece surface is positioned at an unknown distance along the optical axis OA of the optical pen 120, producing the associated profile data 710 having the dominant wavelength peak region shown in FIG. 7. The calibration profile data 410 from FIG. 4, which corresponds to the same particular peak position index coordinate ppic, is labeled and superimposed on the profile data 710 in FIG. 7, for purposes of explanation. It will be understood that only the measurement signals MS(p) are provided during workpiece measurement operations.

FIG. 7 includes a measurement-time peak region that is approximately half as high as the calibration-time peak region corresponding to the same peak position index coordinate ppic. Such an overall intensity difference may arise from varying illumination power, workpiece reflectance, detector integration time, etc. FIG. 7 also shows a contemporaneous measurement bias signal level MVbias, where it is assumed that the signal components Vback(p) (or signals that show the same variation) have been previously removed from the profile data 710. MVbias is different from the corresponding calibration measurement bias CVbias. Such differences may occur due to voltage drifts due to temperature changes, etc., as previously outlined. FIG. 7 also shows a peak pixel coordinate ppc and an associated peak signal level MVpeak (ppc), a peak position index coordinate ppic, a relative peak signal level MVrps(ppic), and a threshold MVthreshold(ppic) that defines the lower limit of a measurement-time distance-indicating subset of the data in the peak region. All "MV" values are in normalized volts. FIG. 7 also shows a measurement distance indicating coordinate (measurement DIC) that is determined based on that distance-indicating subset of the data.

Briefly, in one embodiment, measurement operations for determining a measurement distance indicating coordinate and the resulting distance measurement, for the profile data 710, may include the following:

- Determine the peak position index coordinate ppic corresponding to the profile data 710.
- Determine the contemporaneous measurement bias signal level MVbias.
- Determine the index-specific data-limiting parameter (e.g., CSthresh(ppic)) that corresponds to the determined peak position index coordinate ppic in the stored calibration data.
- Determine the data-limiting threshold MVthreshold(ppic) that defines the measurement-time distance-indicating subset of the data that is used to determine the measurement DIC (e.g., based on MVbias, MVpeak(ppc), and the index-specific data-limiting parameter CSthresh(ppic)).
- Determine the measurement DIC with sub-pixel resolution, based on the distance-indicating subset of the data in the measurement peak region.
- Determine the measurement distance by correlating the measurement DIC with a corresponding distance in the stored distance calibration data.

The determination of all of these elements, and their relationship to one another, will be understood by analogy with the previous description of corresponding calibration elements, and based on further description below.

The pixel coordinate of the highest-valued data point MS(p) of the profile data 710 is the peak pixel coordinate ppc (e.g., ppc=540 in FIG. 7). The associated peak signal level is MVpeak(ppc). For example, MVpeak(ppc)=MVpeak(540) =0.46 volts (approximately) in FIG. 7.

As previously outlined, the peak position index coordinate ppic is an index coordinate determined for a set of profile data analyzed by a CPS according to this invention. The peak position index coordinate ppic is determined based on the profile data and it is proximate to the peak pixel coordinate ppc, and is generally determined in the same manner at calibration-time and measurement-time. In the embodiment shown in FIG. 4, the peak pixel coordinate ppc is used as the peak position index coordinate ppic, and ppic is set equal to the particular value 540, based on the particular profile data 710.

Once the particular peak position index coordinate ppic of the profile data 710 is determined, then index-specific data-limiting parameter CSthresh(ppic) is determined as the value of CSthresh(ppic) that corresponds to the peak position index coordinate ppic in the stored calibration data (e.g., that corresponds to an entry ppic=540 in the table shown in FIG. 6).

In one embodiment, the contemporaneous measurement bias signal level MVbias is determined in the same way as the calibration bias signal level CVbias was determined (e.g., the signal values MS(p) in each bin A-H may be averaged, and the minimum of the 8 averages taken as the contemporaneous measurement bias signal level MVbias). MVbias=0.01 volts (approximately) in FIG. 7.

As previously indicated, in various embodiments according to this invention, it is desirable that the distance-indicating subset of data that is used to determine a measurement DIC corresponding to a peak position index coordinate ppic has a high degree of similarity to the distance-indicating subset of data that was used for determining the calibration DIC(s) corresponding to the same peak position index coordinate ppic. In the embodiment described here, this principle is fulfilled by using the index-specific data-limiting parameter CSthresh(ppic) to establish the data-limiting threshold MVthreshold(ppic) which defines the distance-indicating subset of data that is used to determine the measurement DIC. For convenience, we may define a relative peak signal level MVrps(ppic) defined as:

$$MVrps(ppic)=MVpeak(ppc)-MVbias \qquad (Eq. 5)$$

The relative peak signal level MVrps(ppic) may also be described as the relative peak height.

In one embodiment, the threshold MVthreshold(ppic) is set according to the equation:

$$MVthreshold(ppic)=MVbias+[CSthresh(ppic)*MVrps(ppic)] \qquad (Eq. 6)$$

The distance-indicating subset of data that is used to determine the measurement DIC is then determined to consist of all the data points of the intensity profile data 710 that have a signal value greater than MVthreshold(ppic). Inspection of EQUATIONS 3-6 shows that the operations outlined above cause the measurement DIC to be based on a distance-indicating subset of data that is the same proportion of measurement-time relative peak height (MVrps(ppic)) as was exhibited by the distance-indicating subset of data used to determine the calibration DIC for the same peak position index coordinate during calibration operations. The proportion remains the same regardless of variations in the bias signal level, and regardless of variations in the relative peak height. Thus, the procedure outlined above will cause the data used for the measurement DIC and the calibration DIC to have a high degree of similarity at the same peak position index coordinate ppic (e.g., ideally, the same degree of asymmetry and a linear scaling of the shape of the distance-indicating subset of the data), regardless of variations in the overall intensity of the reflected measurement light, and regardless of variations in the bias signal levels, as desired.

The measurement DIC is then determined with sub-pixel resolution, based on the distance-indicating subset of data. In various embodiments, the measurement DIC may be determined in the same way as the calibration DIC was determined. For example, if the calibration DIC is the coordinate of a centroid determined according to EQUATIONS 1 and 2, the measurement DIC may be similarly determined as the sub-pixel coordinate of a centroid $X_M$ of the distance-indicating subset of data, according to:

$$X_M = \frac{\sum_{p=1}^{1024} p(S_M(p))^n}{\sum_{p=1}^{1024} (S_M(p))^n} \qquad \text{(Eq. 7)}$$

where, $$S_M(p) = \begin{cases} MS(p) - MVthreshold(ppic), & \text{for } MS(p) \geq MVthreshold(ppic) \\ 0, & \text{for } MS(p) < MVthreshold(ppic) \end{cases} \qquad \text{(Eq. 8)}$$

using the same value for the exponent n that was used during calibration operations. It will be appreciated that EQUATION 8 restricts the data used in the centroid calculation to the distance-indicating subset of data. In the ideal case, where the overall intensity difference causes the distance-indicating subset of the profile data 710 to behave substantially as a linearly scale version of the distance-indicating subset of the profile data 410 (relative to their respective bias signal levels), the operations outlined above may produce substantially equal values for the measurement DIC and the calibration DIC.

The measurement distance may be determined as the measurement distance that corresponds to the value of the measurement DIC in the stored calibration data (e.g., in the table shown in FIG. 5). In various embodiments, the stored distance calibration data may be interpolated to give a measurement distance precisely corresponding to the measurement DIC.

It will be appreciated that the embodiments described above are illustrative only, and not limiting. In other embodiments, other index-specific data-limiting parameters may be used instead of the scaled threshold parameter CSthresh(ppic), to similar effect. For example, inspection of EQUATION 4 shows that CSthresh(ppic) is determined based on CVthreshold(ppic), CVbias, and the relative peak signal level CVrps(ppic). Therefore, sets of the parameters CVbias(ppic), CVthreshold(ppic), and CVrps(ppic) could be stored in relation to ppic in a calibration table analogous to that shown in FIG. 6, to embody similar calibration information. MVthreshold(ppic), which determines the distance-indicating subset of measurement-time profile data, could then be derived from such sets of calibration data. Similarly, CVrps(ppic) is determined based on CVpeak(ppc) and CVbias(ppic), thus sets of parameters including CVbias(ppic), CVthreshold(ppic), and CVpeak(ppic) could be stored, with similar effect. Similarly, in embodiments where CVthreshold(ppic) is determined based on constant offset from CVbias(ppic), such sets of parameters may eliminate CVthreshold(ppic) and the corresponding information calculated based on the constant offset instead, and so on.

In one embodiment, when a particular type of workpiece surface is used consistently, or the shape of the profile data peak regions is otherwise predictable and repeatable corresponding to a particular peak position index coordinate, a different type of index-specific data-limiting parameter may be used to cause the measure-time distance-indicating subset of the data to have a high degree of similarity to the calibration-time distance-indicating subset of the data for the same peak position index coordinate ppic. For example, FIG. 7 shows that, ideally, the operations outlined above result in the same lower limit coordinate LL(ppic) and upper limit coordinate UL(ppic) for the distance-indicating subset of the data used for the measurement DIC and the calibration DIC (e.g., when the peak region shape of the profile data 710 behaves substantially as a linearly scale version of the peak region shape of the profile data 410). Thus, in some embodiments, the lower limit coordinate LL(ppic) and upper limit coordinate UL(ppic) observed at the time of calibration operations corresponding to a particular value of ppic are stored in relation to ppic in a calibration table analogous to that shown in FIG. 6. Such index-specific data-limiting parameters may then be used to directly define a similar distance-indicating subset of workpiece measurement profile data corresponding to the same peak position index coordinate ppic. It will be appreciated that other types of index-specific data-limiting parameters may devised and used to similar effect, based on the foregoing disclosure.

Figure 8:
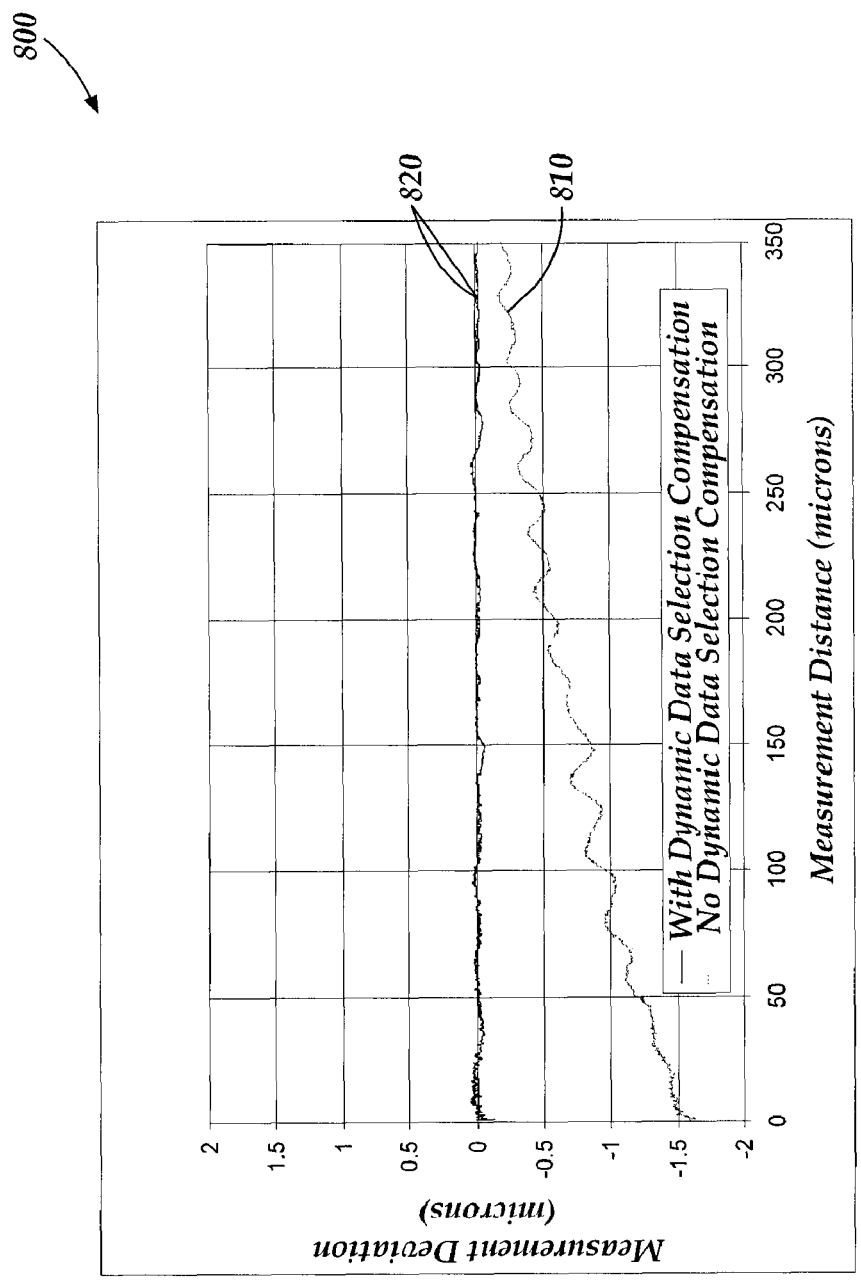
FIG. 8 is a diagram illustrating an improvement in accuracy of a chromatic point sensor utilizing a method according to the present invention.

FIG. 8 is a diagram 800 illustrating an improvement in accuracy of a chromatic point sensor utilizing a method according to the present invention. The measurement deviations (errors) plotted in FIG. 8 are relative to measurement distances provided by an interferometer. The curve 820 shows measurement results obtained using a dynamic data selection compensation method according to this invention when analyzing a CPS intensity data profile. In particular, for the curve 820, each measurement DIC is determined using a measurement-time distance-indicating subset of profile data that is selected and compensated to be similar to a calibration-time distance-indicating subset of profile data corresponding to the same peak position index coordinate, based on index-specific data-limiting parameters, as outlined above. The measurements distances that correlate to these measurement DICs are then determined and plotted in the curve 820. As shown in FIG. 8, the curve 820 approaches ideal accuracy, with a peak-to-peak error on the order of 50-100 nanometers, over a measurement range of approximately 300 microns.

In contrast, using the same underlying measurement data as the curve 820, the curve 810 shows measurement results obtained using a conventional peak-finding technique to determine measurement DICs in a conventional manner. As shown in FIG. 8, the curve 810 shows errors of up to 1.5 microns, or approximately 15 times larger than the largest errors included in the curve 820.

It will be appreciated that the curve 810 also shows significant error undulations over small changes in the measurement distance, whereas the curve 820 does not. It will be appreciated that small changes in measurement distance correspond to small changes in the peak position index coordinate of the underlying measurement data. Thus, the absence of short range undulations in the curve 820 may indicate the value and efficacy of using index-specific data-limiting parameters to dynamically select and compensate the measurement-time distance-indicating subset of data.

Figure 9:
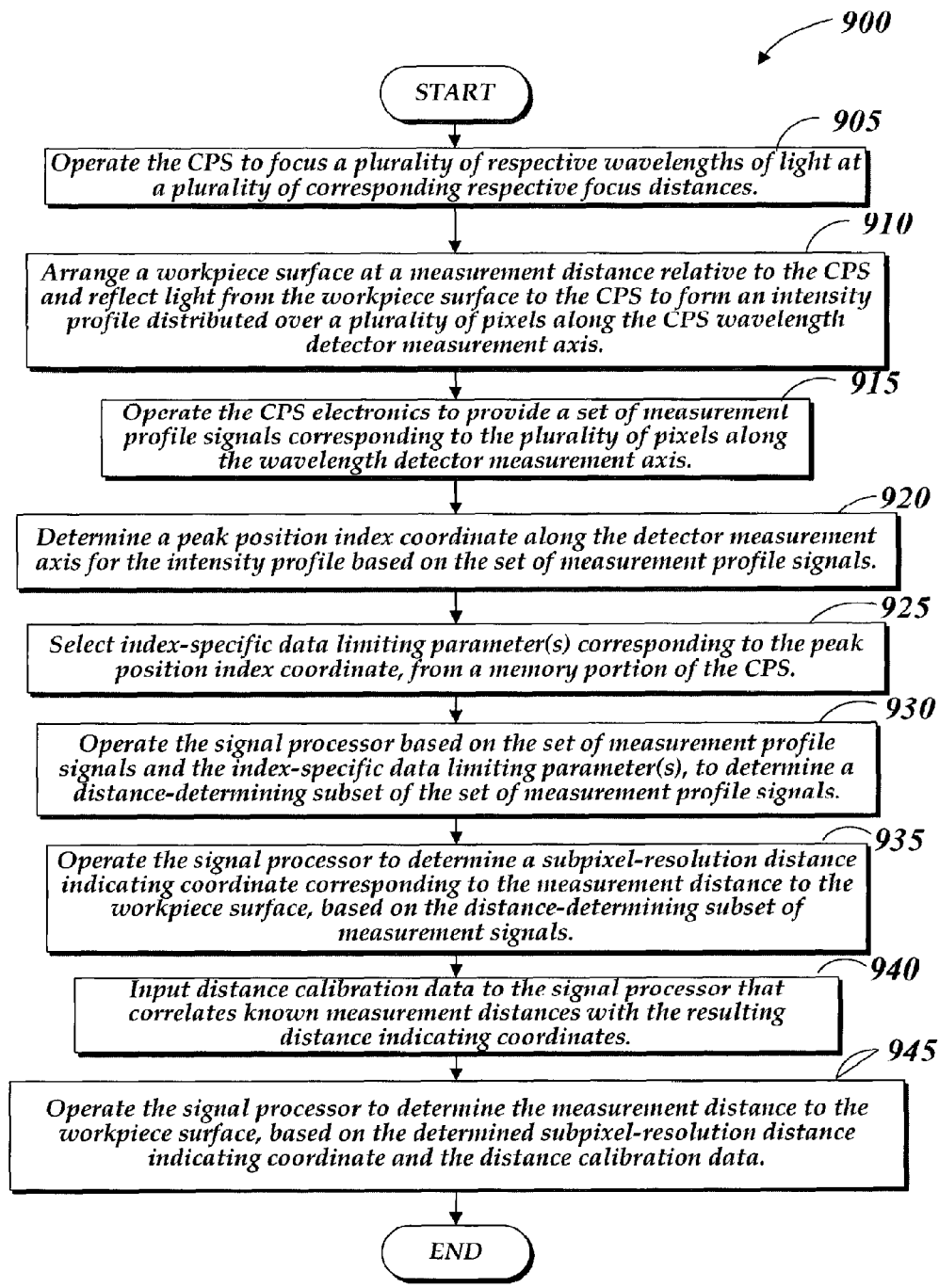
FIG. 9 is a flow diagram illustrating an exemplary routine for operating a chromatic point sensor in accordance with the present invention.

FIG. 9 is a flow diagram illustrating an exemplary routine 900 for operating a chromatic point sensor in accordance with the present invention. At a block 905, the chromatic point sensor is operated to focus a plurality of respective wavelengths of light at a plurality of corresponding respective focus distances. In one embodiment, this corresponds to outputting white light through the chromatic point sensor optical pen, which produces longitudinal chromatic aberration so that its focal length changes with the wavelength of the light. At a block 910, a workpiece surface is arranged at a measurement distance relative to the CPS and light is reflected from the workpiece surface to the CPS to form an intensity profile distributed over a plurality of pixels along the CPS wavelength detector measurement axis. In one embodiment, the formation of the intensity pattern corresponds to the CPS spectrometer forming a spectral intensity profile distributed along a detector array, such as that described above with respect to FIG. 7.

At a block 915, the CPS electronics are operated to provide a set of measurement profile signals corresponding to the plurality of pixels along the wavelength detector array measurement axis. In one embodiment, providing the set of measurement profile signals corresponds to the pixels of the detector array of the spectrometer outputting raw signals which correspond to the intensity profile and compensating those raw signals to remove voltage offset errors as outlined previously, and providing the resulting signals as the set of measurement signals.

At a block 920, a peak position index coordinate along the detector measurement axis (e.g., a peak position index coordinate ppic) is determined for the intensity profile, based on the set of measurement profile signals. At a block 925, index-specific data-limiting parameter(s) corresponding to the peak position index coordinate, are selected from a memory portion of the chromatic point sensor. In one embodiment, the index-specific data-limiting parameter(s) corresponds to stored value(s) such as the values CSthresh(ppic) shown in the calibration lookup table of FIG. 6, stored in association with the corresponding peak position index coordinates ppic. However, in other embodiments, they may be provided in any convenient and functionally analogous form (e.g., as a function in terms of ppic, or the like).

At a block 930, the signal processor is operated based on the set of measurement profile signals and the selected index-specific data-limiting parameter(s), to determine a distance-determining subset of the set of measurement profile signals. In various embodiments, determination of the distance-indicating subset of measurement profile signals provides a dynamically selected and compensated subset of measurement profile signals that has a particularly high degree of similarity to the distance-indicating subset of signals that was used to determine distance calibration data for the CPS, corresponding to the same peak position index coordinate. Exemplary embodiments of operations according to these principles have been outlined previously (e.g., using the index-specific data-limiting parameter(s) to provide a scaled threshold and determining the distance-determining subset of measurement profile signals as those that exceed the scaled threshold).

At a block 935, the signal processor is operated to determine a subpixel-resolution distance indicating coordinate corresponding to the measurement distance to the workpiece surface, based on the distance-determining subset of measurement profile signals. In one embodiment, the subpixel-resolution distance indicating coordinate may be determined with subpixel resolution and accuracy as the centroid coordinate of the distance-indicating subset of measurement profile signals.

At a block 940, distance calibration data is input to the signal processor, wherein the distance calibration data correlates known measurement distances with resulting distance indicating coordinates from the CPS. In one embodiment, the measurement distance calibration data corresponds to the calibration lookup table of FIG. 5. However, in other embodiments, it may be provided in any convenient and functionally analogous form (e.g., as a correlation function, or the like). At a block 945, the signal processor is operated to determine the measurement distance to the workpiece surface, based on the determined subpixel-resolution distance indicating coordinate and the distance calibration data. In one embodiment, the determination of the measurement distance to the workpiece surface corresponds to correlating the subpixel-resolution distance indicating coordinate to the corresponding stored distance value (e.g., from the calibration lookup table of FIG. 5).

According to the previous disclosure, a method according to this invention may provide a CPS with significantly improved accuracy and robustness. It should be appreciated that accuracy and robustness improvements in the submicron regime indicated in FIG. 8 are extremely difficult to attain, and some CPS error components eliminated according to the methods of this invention may not have been previously recognized. Thus, the invention principles and specific embodiments disclosed herein provide a novel combination of features that deviate from known methods to produce a previously unknown and unpredicted combination of benefits. This is particularly true when it is considered that it is a further objective of CPS systems to produce high measurement rates, for example 5-75 KHz measurement rates. It should be appreciated that the various embodiments outlined above are particularly well suited to supporting such measurement rates, while at the same time the measurements are based on data that is uniquely dynamically selected and compensated to provide the robustness and accuracy benefits shown in FIG. 8.

While the preferred embodiment of the invention has been illustrated and described, numerous variations in the illustrated and described arrangements of features and sequences of operations will be apparent to one skilled in the art based on this disclosure. Thus, it will be appreciated that various changes can be made therein without departing from the spirit and scope of the invention.

The embodiments of the invention in which an exclusive property or privilege is claimed are defined as follows:

1. A method for operating a chromatic point sensor for measuring a distance to a workpiece surface, the chromatic point sensor including an optical pen comprising a chromatically dispersive optical system and a spatial filtering aperture, and an electronics portion comprising a wavelength detector, a calibration memory portion including data corresponding to sets of index-specific data-limiting parameters and a signal processor, the method for operating the chromatic point sensor including measurement operations comprising:

operating the chromatic point sensor to output multi-wavelength light through the optical pen and focus a plurality of respective wavelengths of light along an optical axis at a plurality of corresponding respective focus distances;

arranging a workpiece surface along the optical axis at a measurement distance relative to the optical pen;

reflecting the respective wavelengths of light from the workpiece surface through the optical pen, and into the wavelength detector, to form a resulting spectral intensity profile distributed over a plurality of pixels along a measurement axis of a detector array of the wavelength detector; and operating the electronics portion to perform a set of operations comprising:

providing a set of measurement-time profile data corresponding to the plurality of pixels along the wavelength detector measurement axis;

determining a peak position index coordinate ppic based on the set of measurement-time profile data, the peak position index coordinate ppic corresponding approximately to a position of the spectral peak of the spectral intensity profile along the detector array measurement axis;

selecting a set of index-specific data-limiting parameters that are utilized as part of a process for determining a distance-indicating subset of the set of measurement-time profile data, the set of index-specific data-limiting parameters corresponding to the peak position index coordinate ppic from the calibration memory portion, the set comprising at least one index-specific data-limiting parameter;

determining a distance-indicating subset of the set of measurement-time profile data based on the set of measurement-time profile data and the selected set of index-specific data limiting parameters;

determining a subpixel-resolution distance-indicating coordinate corresponding to the measurement distance to the workpiece surface, based on the distance-indicating subset of measurement-time profile data; and determining the measurement distance to the workpiece surface, based on the determined subpixel-resolution distance-indicating coordinate and distance calibration data that correlates known measurement distances with resulting distance-indicating coordinates from the chromatic point sensor.

2. The method of claim 1, wherein:
the calibration memory portion stores respective sets of index-specific data limiting parameters, and each respective set is stored in association with a respective peak position index coordinate ppic; and
the step of selecting a set of index-specific data limiting parameters corresponding to the peak position index coordinate ppic comprises selecting the respective set that is stored in association with a respective peak position index coordinate ppic that is closest in value to the determined peak position index coordinate ppic.

3. The method of claim 2, wherein:
the peak position index coordinate ppic is determined as the value of a determined peak pixel coordinate ppc corresponding to the peak signal level in the measurement-time profile data along the measurement axis of the detector array;
the calibration memory portion stores each respective set of index-specific data limiting parameters in association with a respective peak position index coordinate ppic that has an integer value; and
the step of selecting a set of index-specific data limiting parameters corresponding to the peak position index coordinate ppic comprises selecting the respective set that is stored in association with a respective peak position index coordinate ppic that is the same as the determined peak pixel coordinate ppc.

4. The method of claim 1, wherein the step of determining a subpixel-resolution distance-indicating coordinate comprises at least one of (a) determining a subpixel-resolution coordinate for a centroid of the distance-indicating subset of measurement-time profile data, and (b) determining a subpixel-resolution coordinate for a peak of a function that is fit to the distance-indicating subset of measurement-time profile data.

5. The method of claim 1, wherein:
the distance calibration data that correlates known measurement distances with the resulting distance-indicating coordinates from the chromatic point sensor comprises distance calibration data provided by calibration operations wherein the distance-indicating coordinate for a respective set of calibration-time profile data is determined based on a respective distance-indicating subset of the calibration-time profile data, which is characterized by at least one subset-defining feature that has a value which varies with the respective peak position index coordinate ppic;
the data stored in the calibration memory portion comprises data corresponding to respective sets of index-specific data-limiting parameters associated with respective peak position index coordinates ppic, wherein each particular set of index-specific data-limiting parameters that is indexed by a particular peak position index coordinate ppic is based on a particular distance-indicating subset of calibration-time profile data corresponding to that particular peak position index coordinate ppic, and is indicative of the value of the at least one subset-defining feature that characterizes that particular distance-indicating subset of calibration-time profile data; and
the step of determining the distance-indicating subset of the set of measurement-time profile data comprises determining the distance-indicating subset of measurement-time profile data such that if it is characterized by the at least one subset-defining feature in the same manner as the corresponding distance-indicating subset of calibration time profile data corresponding to the same peak position index coordinate ppic, then the distance-indicating subset of measurement-time profile data and the distance-indicating subset of calibration-time profile data will result in substantially the same value for the at least one subset-defining feature.

6. The method of claim 5, wherein for a set of contemporaneous profile data having a peak position index coordinate ppic, and a relative peak height Vrps above a bias signal level Vbias, the at least one subset-defining feature characterizes a data-limiting threshold value Vthreshold of a distance-indicating subset of the contemporaneous profile data as a proportion Sthresh(ppic) of the relative peak height Vrps above the bias signal level Vbias, and the distance-indicating subset of measurement-time profile data and the distance-indicating subset of calibration-time profile data will result in substantially the same value for the proportion Sthresh(ppic).

7. The method of claim 6, wherein:
the set of contemporaneous profile data has a peak signal level Vpeak, the relative peak height Vrps is defined as Vrps=[Vpeak−Vbias], and the proportion Sthresh(ppic) is defined as Sthresh(ppic)=[Vthreshold−Vbias)]/[Vpeak−Vbias]; and
selecting a set of index-specific data-limiting parameters corresponding to the peak position index coordinate ppic comprises selecting a set comprising at least one of (a) a parameter indicative of the ratio [(Vpeak−Vbias)/(Vthreshold−Vbias)] based on calibration-time values for Vpeak, Vbias, and Vthreshold, (b) a parameter indicative of the ratio [(Vpeak−Vbias)/(Vp−Vthreshold)] based on calibration-time values for Vpeak, Vbias, and Vthreshold, (c) a set of parameters comprising calibration-time values for Vpeak, Vbias, and Vthreshold, and (d) the proportion Sthresh(ppic) based on calibration-time values for Vpeak, Vbias, and Vthreshold.

8. The method of claim 5, wherein:
for a set of contemporaneous profile data having a peak position index coordinate ppic, a lower limit pixel LL(ppic) that provides a signal included in a distance-indicating subset of the contemporaneous profile data, the lower limit pixel LL(ppic) being the farthest pixel in the distance-indicating subset to a first side of the peak position index coordinate ppic along the detector measuring axis, and an upper limit pixel UL(ppic) that provides a signal included in the distance-indicating subset of the contemporaneous profile data, the upper limit pixel UL(ppic) being the farthest pixel in the distance-indicating subset to the other side of the peak position index coordinate ppic along the detector measuring axis,
the at least one subset-defining feature characterizes at least two values comprising at least two of (a) a pixel coordinate value of the lower limit pixel LL(ppic), (b) a pixel coordinate value of the upper limit pixel UL(ppic), (c) a difference between the peak position index coordinate ppic and the pixel coordinate value of the upper limit pixel UL(ppic), (d) a difference between the peak position index coordinate ppic and the coordinate value of the lower limit pixel LL(ppic), and (e) a difference between the coordinate value of the lower limit pixel LL(ppic) and the coordinate value of the upper limit pixel UL(ppic).

9. The method of claim 8, wherein:
selecting a set of index-specific data-limiting parameters corresponding to the peak position index coordinate ppic comprises selecting a set comprising at least two of (a) a pixel coordinate value of the lower limit pixel LL(ppic), (b) a pixel coordinate value of the upper limit pixel UL(ppic), (c) a difference between the peak position index coordinate ppic and the pixel coordinate value of the upper limit pixel UL(ppic), (d) a difference between the peak position index coordinate ppic and the coordinate value of the lower limit pixel LL(ppic), and (e) a difference between the coordinate value of the lower limit pixel LL(ppic) and the coordinate value of the upper limit pixel UL(ppic).

10. The method of claim 1, wherein determining a distance-indicating subset of the set of measurement-time profile data based on the set of measurement-time profile data and the selected set of index-specific data limiting parameters comprises:
determining a peak signal level MVpeak and bias signal level MVbias based on the set of measurement-time profile data;
determining a data-limiting signal level MVthreshold for the distance-indicating subset of measurement-time profile data, based on MVpeak, MVbias, and the selected set of index-specific data limiting parameters corresponding to the peak position indicating coordinate ppic; and
determining the distance-indicating subset of measurement-time profile data as the largest subset wherein each profile signal level is at least as large as the data-limiting signal level MVthreshold.

11. The method of claim 10, wherein:
the data stored in the calibration memory portion comprises data corresponding to respective sets of index-specific data-limiting parameters associated with respective peak position index coordinates ppic, wherein:
each particular set of index-specific data-limiting parameters that is indexed by a particular peak position index coordinate ppic is based on a particular distance-indicating subset of calibration-time profile data corresponding to that particular peak position index coordinate ppic, the calibration-time profile data having had a peak signal level CVpeak, a bias signal level CVbias, and a calibration-time data-limiting signal level CVthreshold, wherein the particular distance-indicating subset of calibration-time profile data consisted of the largest subset of calibration-time profile data and wherein each profile signal level was at least as large as the calibration-time data-limiting signal level CVthreshold, and
each particular set of index-specific data-limiting parameters that is indexed by a particular peak position index coordinate ppic is indicative of a scaled threshold ratio CSthresh(ppic) defined as CSthresh(ppic)=[(CVthreshold−CVbias)/(CVpeak−CVbias)] based on the calibration-time profile data corresponding to the particular peak position index coordinate ppic; and
determining a data-limiting signal level MVthreshold for the distance-indicating subset of measurement-time profile data, based on MVpeak, MVbias, and the selected set of index-specific data limiting parameters corresponding to the peak position indicating coordinate ppic, comprises determining MVthreshold such that [(MVthreshold−MVbias)/(MVpeak−MVbias)] =CSthresh(ppic).

12. The method of claim 11, wherein selecting a set of index-specific data-limiting parameters corresponding to the peak position index coordinate ppic comprises selecting a set comprising at least one of (a) a parameter indicative of the ratio [(CVthreshold−CVbias)/(CVpeak−CVbias)], (b) a parameter indicative of the ratio [(CVpeak−CVthreshold)/(CVpeak−CVbias)], (c) a set of parameters comprising CVpeak, CVbias, and CVthreshold, and (d) the scaled threshold ratio CSthresh(ppic).

13. The method of claim 1, wherein the step of providing a set of measurement-time profile data comprises providing measurement-time profile data that is compensated for background signal components that are not related to the light reflected from the workpiece surface.

14. A chromatic point sensor for measuring a distance to a workpiece surface, the chromatic point sensor including:
an optical pen comprising a chromatically dispersive optical system and a spatial filtering aperture; and
an electronics portion comprising:
a wavelength detector including a detector array comprising a plurality of pixels arranged along a measurement axis of the detector array,
a calibration memory portion including:
a first type of stored data corresponding to sets of index-specific data-limiting parameters, and
a second type of stored data comprising distance calibration data that correlates known measurement distances with resulting distance-indicating coordinates from the chromatic point sensor; and
a signal processor,
wherein, the electronics portion is configured to perform a set of measurement operations when measuring a distance to a workpiece surface that forms a resulting spectral intensity profile distributed over the plurality of pixels along the detector array measurement axis, the set of measurement operations comprising:

providing a set of measurement-time profile data corresponding to the plurality of pixels along the detector array measurement axis;

determining a peak position index coordinate ppic based on the set of measurement-time profile data, the peak position index coordinate ppic corresponding approximately to a position of the spectral peak of the spectral intensity profile along the detector array measurement axis;

selecting a set of index-specific data-limiting parameters that are utilized as part of a process for determining a distance-indicating subset of the set of measurement-time profile data, the set of index-specific data-limiting parameters corresponding to the peak position index coordinate ppic from the first type of stored data included in the calibration memory portion, the set comprising at least one index-specific data-limiting parameter;

determining a distance-indicating subset of the set of measurement-time profile data based on the set of measurement-time profile data and the selected set of index-specific data limiting parameters;

determining a subpixel-resolution distance-indicating coordinate corresponding to the measurement distance to the workpiece surface, based on the distance-indicating subset of measurement-time profile data; and determining the measurement distance to the workpiece surface, based on the determined subpixel-resolution distance-indicating coordinate and the second type of stored data included in the calibration memory portion, which comprises distance calibration data that correlates known measurement distances with resulting distance-indicating coordinates from the chromatic point sensor.

15. The chromatic point sensor of claim 14, wherein determining a distance-indicating subset of the set of measurement-time profile data based on the set of measurement-time profile data and the selected set of index-specific data limiting parameters comprises:

determining a peak signal level MVpeak and bias signal level MVbias based on the set of measurement-time profile data;

determining a data-limiting signal level MVthreshold for the distance-indicating subset of measurement-time profile data, based on MVpeak, MVbias, and the selected set of index-specific data limiting parameters corresponding to the peak position indicating coordinate ppic; and determining the distance-indicating subset of measurement-time profile data as the largest subset wherein each profile signal level is at least as large as the data-limiting signal level MVthreshold.

16. The chromatic point sensor of claim 15, wherein:

the first type of data stored in the calibration memory portion comprises data corresponding to respective sets of index-specific data-limiting parameters associated with respective peak position index coordinates ppic, wherein:

each particular set of index-specific data-limiting parameters that is indexed by a particular peak position index coordinate ppic is based on a particular distance-indicating subset of calibration-time profile data corresponding to that particular peak position index coordinate ppic, the calibration-time profile data having had a peak signal level CVpeak, a bias signal level CVbias, and a calibration-time data-limiting signal level CVthreshold, wherein the particular distance-indicating subset of calibration-time profile data consisted of the largest subset of calibration-time profile data wherein each profile signal level was at least as large as the calibration-time data-limiting signal level CVthreshold, and each particular set of index-specific data-limiting parameters that is indexed by a particular peak position index coordinate ppic is indicative of a scaled threshold ratio CSthresh(ppic) defined as CSthresh(ppic)=[(CVthreshold−CVbias)/(CVpeak−CVbias)] based on the calibration-time profile data corresponding to the particular peak position index coordinate ppic; and determining a data-limiting signal level MVthreshold for the distance-indicating subset of measurement-time profile data, based on MVpeak, MVbias, and the selected set of index-specific data limiting parameters corresponding to the peak position indicating coordinate ppic, comprises determining MVthreshold such that [(MVthreshold−MVbias)/(MVpeak−MVbias)] =CSthresh(ppic).

* * * * *